(12) United States Patent
Nakata

(10) Patent No.: US 6,779,243 B2
(45) Date of Patent: Aug. 24, 2004

(54) GROMMET WITH RESIN INNER SLEEVE FOR FIXATION OF CONNECTOR AND METHOD OF INSTALLING THE GROMMET

(75) Inventor: Hiroyuki Nakata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 82 days.

(21) Appl. No.: 10/178,554

(22) Filed: Jun. 25, 2002

(65) Prior Publication Data

US 2003/0017027 A1 Jan. 23, 2003

(30) Foreign Application Priority Data

Jun. 26, 2001 (JP) ........................................ 2001-192722

(51) Int. Cl.[7] .......................... B23P 11/02; B23P 19/00; H01R 43/20; H01B 17/26
(52) U.S. Cl. ............................. 29/451; 29/450; 29/453; 29/729; 29/747; 29/428; 174/153 G
(58) Field of Search ........................ 29/451, 450, 453, 29/729, 747, 428; 174/153 G, 65 G, 31 R; 16/2.1, 2.2; 248/56; 411/190

(56) References Cited

U.S. PATENT DOCUMENTS 6,603,078 B2 * 8/2003 Okuhara et al. ........ 174/153 G

FOREIGN PATENT DOCUMENTS

JP 10261464 9/1998

* cited by examiner

Primary Examiner—John C. Hong
(74) Attorney, Agent, or Firm—Greenblum & Bernstein, P.L.C.

(57) ABSTRACT

A grommet having a resin inner sleeve which is adapted to receive a connector that is installed on a wire harness. The grommet is insertable into a penetration hole of a car body panel of an automobile. The inner sleeve includes a car body hooking hook that is arranged on an outer face of a peripheral wall. The inner sleeve is stored and fixed in an enlarged tubular portion and includes a peripheral wall having a bottom face. A grommet main body is made of an elastomer and includes the enlarged tubular portion located at one end of a small diameter tubular portion which is adapted to receive electric wires. A connector is fixable in the inner sleeve by locking and includes a terminal insertion face. The bottom face of the peripheral wall abuts on a bottom wall of the enlarged tubular portion. A large space is provided between the terminal insertion face of the connector and the bottom wall of the enlarged tubular portion. The grommet is installable on the automobile in a manner in which no load is applied to the electric wires, which are inserted through the small diameter tubular portion, when the bottom wall of the enlarged tubular portion experiences a pressing force.

10 Claims, 4 Drawing Sheets

GROMMET WITH RESIN INNER SLEEVE FOR FIXATION OF CONNECTOR AND METHOD OF INSTALLING THE GROMMET

CROSS-REFERENCE TO RELATED APPLICATIONS

The present application claims priority under 35 U.S.C. §119 of Japanese Patent Application No. JP 2001-192722 filed on Jun. 26, 2001, the disclosure of which is expressly incorporated by reference herein in its entirety.

BACKGROUND OF THE INVENTION

1. Field of the Invention

The present invention relates to a grommet having a resin inner sleeve for fixing a connector, and specifically relates to a grommet which is assembled on a wire harness wired in an automobile and which is mounted in the penetration hole of a car body panel.

2. Background of the Invention

When a door harness that is wired to a door side is hung, for example, in the penetration hole of a car body panel through the penetration hole of a door panel, the grommet 1, as shown in FIG. 5A, has been conventionally installed on a wire harness W/H between the door panel and the car body panel. An inner sleeve 3 made of a resin is assembled in the inside of the enlarged tubular portion 2a of the grommet 1. The enlarged tubular portion 2a is provided at one end of the grommet main body 2 which is made of a rubber or an elastomer. The grommet 1 is designed to be hooked, via one hand only, by inserting the locking hook 3a which is provided at the outer face of the inner sleeve 3, into the penetration hole H1 of the car body panel A.

Specifically, the above-mentioned grommet 1, which is hooked in the penetration holes H1 and H2 that are provided on the car body panel A and the door panel B, includes a the enlarged tubular portion 2c which is mounted in the penetration hole H2 of the door panel B. The enlarged tubular portion 2c is located at one end of the bellows shape small diameter tubular portion 2b of the grommet main body 2, and is continuously formed with the above-mentioned enlarged tubular portion 2a and is mounted in the penetration hole H1 of the car body panel A, at another end. A hooking groove 2d is provided on the outer peripheral face of the enlarged tubular portion 2c of the door panel B side. The hooking groove 2d is configured to be fitted in the peripheral rim of the penetration hole H2 and allows the grommet 1 to be mounted in a sealed condition.

The inner sleeve 3 is made of a resin and is hooked to the grommet 1 by being internally fitted in the enlarged tubular portion 2a. An edge face of peripheral wall 3c of the inner sleeve 3 abuts or is adjacent to on the bottom wall 2e of the enlarged tubular portion 2a. Further, a locking hook 3a for hooking the grommet 1 to a car body is provided on the peripheral wall 3c of the inner sleeve 3. The locking hook 3a protrudes slightly from the edge opening of the enlarged tubular portion 2a.

A locking frame 3b is also provided on the peripheral wall of the inner sleeve 3. A locking hook 4b of the connector 4 is connected with electric wire terminal which is inserted into the small diameter tubular portion 2b. The connector 4 is fixed in the inner sleeve 3 by locking using the locking hook 4b and the locking frame 3b. However, this configuration locates the terminal insertion face 4a at or very close to the bottom wall 2e. Additionally, the face 4a is arranged at about the same plane with the peripheral wall 3c of the inner sleeve 3. Accordingly, the terminal insertion face 4a is situated close to the bottom wall 2e of the enlarged tubular portion 2a with only a slight gap S. As a result of this arrangement, the electric wires W which pass through the small diameter tubular portion 2b from the door panel side and are thereafter inserted and hooked into the cavity of the connector 4, tend to hit and/or engage the bottom wall 2e of the enlarged tubular portion 2a at an under-neck position of the connector 4, i.e., when the wires are wired into the connector 4, they experience significant bending because the gap S between wall 2e and terminal insertion face 4a is relatively small, i.e., approximately 5 mm.

When the grommet 1 is assembled into the penetration hole H1, the bottom wall 2e of the enlarged tubular portion 2a experiences significantly and vigorously pushing forces in the insertion direction from an outside direction. As a result, the peripheral wall 3c of the inner sleeve 3 of the inside also experiences pushing forces until the locking hook 3a at the edge of the inner sleeve 3 is inserted into the penetration hole H1. The locking hook 3a fixes and/or hooks the grommet 1 at the peripheral rim of the inside face of the penetration hole H1, in the manner shown in FIG. 5A. However, during this installation procedure, the electric wires W which are already installed in the grommet 1 and in the connector 4, necessarily also experience strong pushing forces from outside, especially in the area of bending portion C, which contacts and/or engages the bottom wall 2e of the enlarged tubular portion 2a. The electric wires W are thus liable to experiencing a great loads or forces. Accordingly, because the wires experience such forces, it is possible that they can be damaged, snapped or broken, etc.

Further, since the electric wires W are wired into the connector in a manner in which they are significantly bent within the slight gap S at the under-neck position of the connector 4, there also exists the problem that the bottom wall 2e of the enlarged tubular portion 2a is pushed, deflected, or otherwise deformed away from the connector by tension forces of the electric wires W, as shown in FIG. 5B. As a result, the grommet 1 can appear swollen.

SUMMARY OF THE INVENTION

The present invention therefore provides a grommet which includes a resin inner sleeve for fixing a connector wherein the grommet reduces a load that is loaded on electric wires during installing of the grommet and provides for a grommet which maintains a good appearance after it is installed.

The present invention provides a grommet having a resin inner sleeve for fixing a connector. The grommet is designed to be installed on a wire harness and is designed to be inserted into the penetration hole of the car body panel of an automobile. An inner sleeve made of a resin includes a car body hooking hook which protrudes from the inner sleeve. The inner sleeve has an outer face and a peripheral wall and is stored, fixed and/or otherwise retained in an enlarged tubular portion of a grommet main body. The grommet main body is made of an elastomer and is formed with the above-mentioned enlarged tubular portion being located at one end. A small diameter tubular portion of the grommet allows electric wires to pass through the grommet. The inner sleeve is utilized to firmly fix and/or lock the grommet to an automobile panel. The inner sleeve is adapted to receive the connector and includes a peripheral wall. The peripheral wall of the inner sleeve protrudes back past the terminal insertion face of the connector, such that the bottom face of the peripheral wall abuts on a bottom wall of the enlarged tubular portion of the grommet main body. A large space is thus provided between the terminal insertion face of the connector and the bottom wall of the enlarged tubular portion. As a result, the grommet is structured in such a manner that no load will be applied to electric wires upon installation, i.e., the wires which are already inserted into the small diameter tubular portion and into the connector do not experience loads when a user presses against the bottom wall of the enlarged tubular portion during installation of the grommet.

As described above, since a relatively large space (e.g., of approximately 3 to approximately 4 times, or more, versus that of the prior art) is provided between the terminal insertion face of the connector and the bottom face of the peripheral wall of the inner sleeve and further, between the bottom wall of the enlarged tubular portion and the terminal insertion face of the connector, the portion of the electric wires which are located in the area of the under-neck position of the connector are not bent to a significant extent or angle, as in the prior art. The electric wires in the under-neck position of the connector are thus protected by the resin inner sleeve which greatly protrudes and/or extends from the terminal insertion face. According to this arrangement, even if the bottom wall of the enlarged tubular portion experiences pressing loads or forces during installation of the grommet into the penetration hole, such loads are not transferred in any significant way to the wires. As a result, the grommet can be installed without fear that the electric wires may be snapped, broken or damaged, etc.

As discussed above, the bottom face of the peripheral wall of the inner sleeve greatly protrudes past the terminal insertion face of the connector, extends to the bottom wall of the enlarged tubular portion, and engages the bottom wall. As a result of this arrangement, one can effectively insert the inner sleeve into the penetration hole by pushing against the bottom wall of the enlarged tubular portion upon installation of the grommet into the penetration hole. Moreover, making the inner sleeve longer acts to reinforce from the inside the whole enlarged tubular portion. This is an important advantage of the invention since the enlarged tubular portion is liable to be strongly pressured by a worker upon installation of the grommet. Accordingly, the invention allows a worker to install the grommet more easily.

Furthermore, since the invention provides for a relatively large space between the terminal insertion face of the connector and the bottom wall of the enlarged tubular portion, the electric wires in the enlarged tubular portion do not engage and/or are not pressed against the bottom wall of the enlarged tubular portion. Moreover, this large space means that the wires are not bent at a steep angle between the connector and the small diameter tubular portion. Instead, the wires are allowed to have curve leniently in this area. Another advantage of this large space is that the wires do not engage, deflect, and/or deform the bottom wall of the enlarged tubular portion. Accordingly, unlike the prior art, the grommet will not have a swollen appearance which results from contact between the wires and the bottom wall. Instead, the grommet will have an improved appearance after it is installed because the wires do not deform the grommet.

The invention therefore provides a grommet that is insertable into a penetration hole of a car body panel of an automobile wherein the grommet includes a resin inner sleeve which is adapted to receive a connector that is installed on a wire harness. The inner sleeve includes a peripheral wall having a bottom face and a car body hooking hook that is arranged on an outer face of a peripheral wall, the inner sleeve being stored and fixed in an enlarged tubular portion. A grommet main body is made of an elastomer and includes the enlarged tubular portion located at one end of a small diameter tubular portion which is adapted to receive electric wires. A connector receiving cavity is defined in the inner sleeve and includes a terminal insertion face. The connector receiving cavity is adapted to receive a connector. The bottom face of the peripheral wall abuts on a bottom wall of the enlarged tubular portion. A large space is provided between the terminal insertion face and the bottom wall of the enlarged tubular portion. The grommet is installable on the automobile in a manner in which no load is applied to the electric wires which are inserted through the small diameter tubular portion when the bottom wall of the enlarged tubular portion experiences a pressing force.

The inner sleeve may include an inner lip in the area of the bottom face of the peripheral wall. The connector may be locked within the inner sleeve.

The invention also provides for a grommet which includes a grommet main body having a bellows shaped portion and an enlarged portion. An inner sleeve is retained within the enlarged portion and is adapted to receive a connector. The inner sleeve includes a peripheral wall with a bottom face, and engaging hooks which are configured to engage an opening in an automobile panel so as to secure the grommet to the automobile panel. The inner sleeve includes a cavity which is configured to receive a connector, wherein the cavity defines a terminal insertion plane. A space is defined between the terminal insertion plane and the bottom face whereby the space is large enough to allow wires of a wire harness to be installed into the connector without the wires significantly engaging a bottom wall of the enlarged portion. Wherein, when the grommet is installed into the automobile panel and experiences pressing forces in the area of the bottom wall of the enlarged portion, the wires are not significantly stressed or damaged by the installation.

The invention also provides a method of installing the grommet into a penetration hole of a car body panel of an automobile, which includes installing the wiring harness in the grommet, and hooking the inner sleeve into the penetrating hole so that the enlarged tubular portion engages the car body panel.

The invention also provides a grommet that includes a grommet main body having a bellows shaped portion and an enlarged portion. An inner sleeve is retained within the enlarged portion and is adapted to receive a connector. The inner sleeve includes a peripheral wall with a bottom face, and engaging hooks which are configured to engage an opening in an automobile panel so as to secure the grommet to the automobile panel. A space is defined between a terminal insertion plane and the bottom face whereby the space is large enough to allow wires of a wire harness to be installed into the connector without the wires significantly engaging a bottom wall of the enlarged portion.

The inner sleeve may include a cavity which is configured to receive a connector, wherein the cavity defines the terminal insertion plane. When the grommet is installed into the automobile panel and experiences pressing forces in the area of the bottom wall of the enlarged portion, the wires may not significantly stressed or damaged by the installation.

The invention also provides for a method of installing the grommet into a penetration hole of a car body panel of an automobile wherein the method includes installing the wiring harness in the grommet and hooking the inner sleeve into the penetrating hole so that the enlarged tubular portion engages the car body panel.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The mode of operation of the present invention is illustrated below referring to FIGS. 1–4.

Figure 5A:
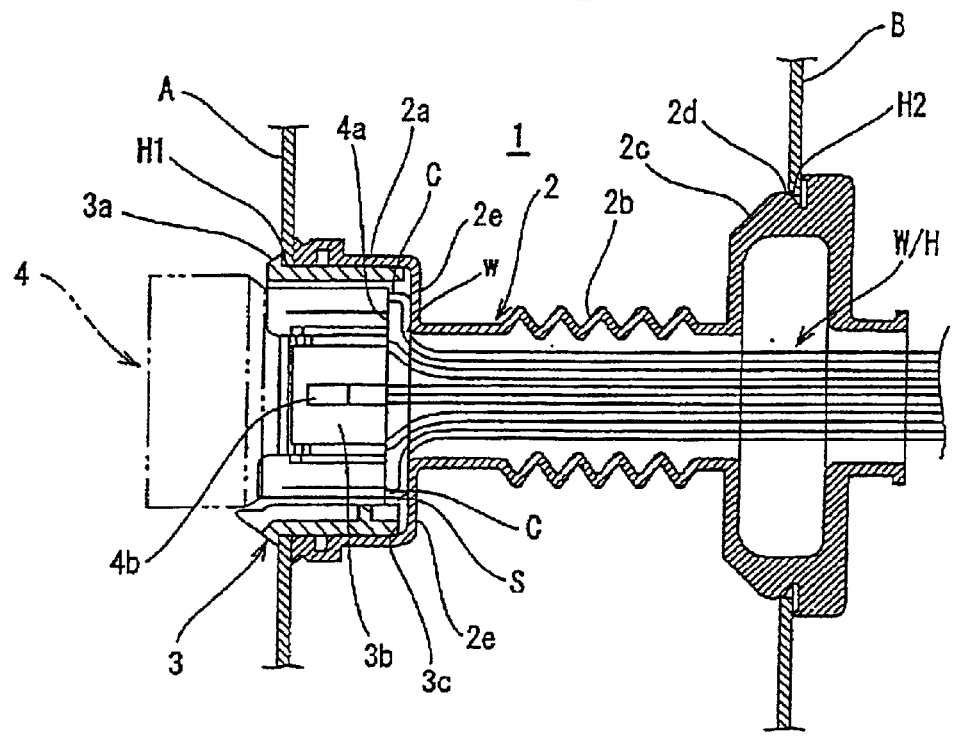
FIGS. 5A and 5B show sectional views illustrating a conventional example.
Figure 5B:
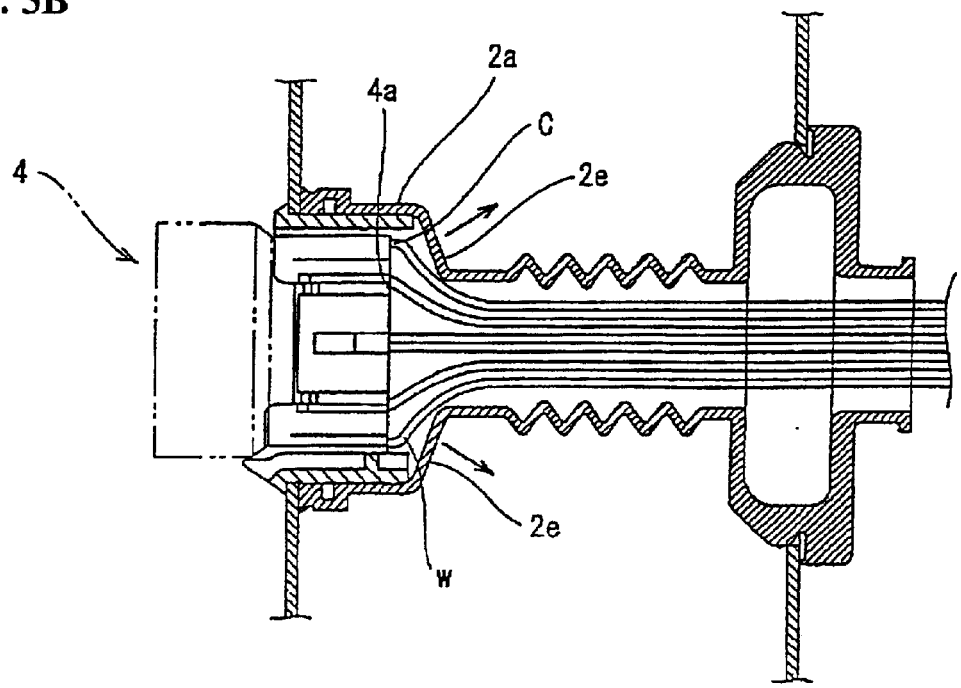

The grommet 10 is inserted and/or passed through penetration hole H2 of the door panel B in manner similar to that described with regard to the prior art (see FIGS. 5A–5B). Then, the wire harness W/H is passed and/or inserted in penetration hole H1 of the car body panel A and placed into the grommet 10. Next, the connector 30 with the wire harness W/H is fixed and/or connected to the grommet 30.

Figure 1A:
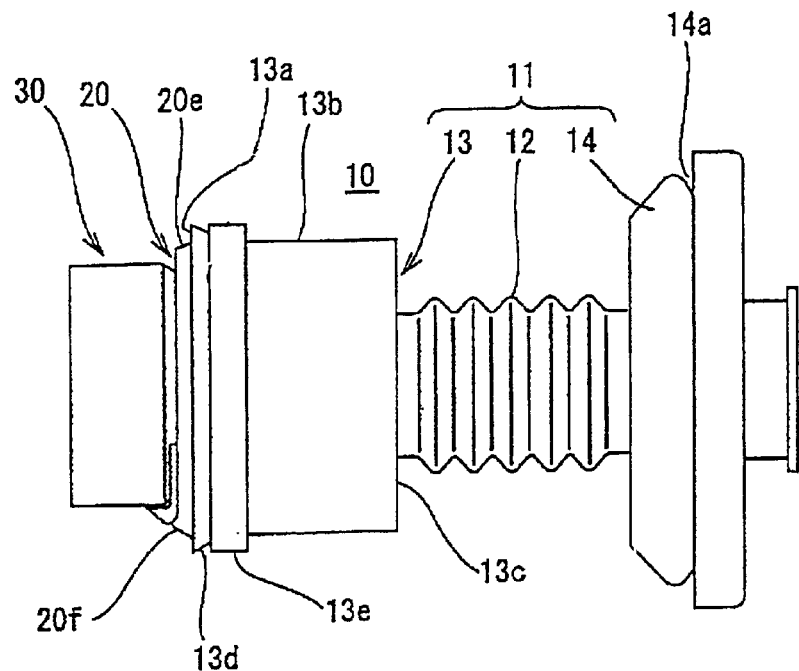
FIGS. 1A and 1B show a grommet in a condition in which it is installed on a wire harness, with FIG. 1A showing a frontal view and FIG. 1B showing a sectional view.
Figure 1B:
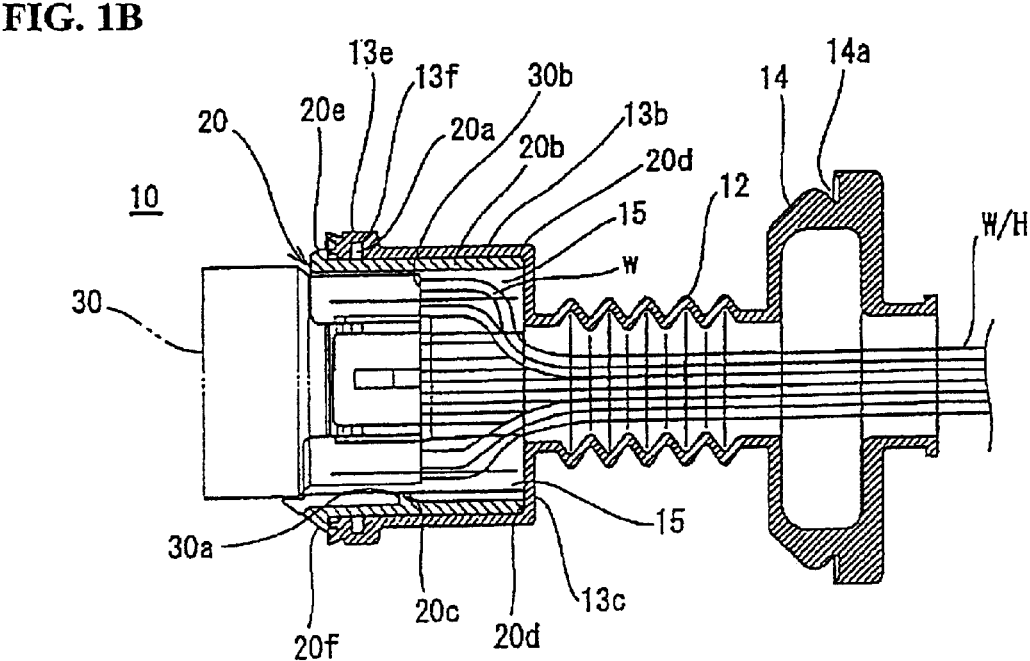

As shown in FIGS. 1A and 1B, the grommet 10 includes a grommet main body 11 which is made of a rubber or an elastomer, and an inner sleeve 20 made of a resin. The grommet main body 11 is continuously molded and/or integrally formed with the enlarged tubular portions 13 and 14. These enlarged tubular portions have a rectangular shape, but may also have other shapes such as, e.g., circular or square. These tubular portions 13 and 14 are arranged at both ends of a bellows-shaped small diameter tubular portion 12. As can be seen from these figures, electric wires W are inserted through portions 12–14. Enlarged tubular portion 13 stores, retains, and/or otherwise houses an inner sleeve 20 which is made of a resin. The inner sleeve is configured to inserted inside of the enlarged tubular portion 13. The other enlarged tubular portion 14 includes a hooking groove 14a which is adapted to be mounted in a penetration hole H2 of the door panel B. The groove 14a is a concave shaped groove and is located at an outer periphery of the enlarged tubular portion 14 between a short section and a rounded and tapered section. The rounded and tapered section is smaller in size than the short section and terminates in a bottom wall at the beginning of the small diameter tubular portion 12.

The enlarged tubular portion 13 is configured to retain the inner sleeve 20 and includes a protruding seal lip 13d. The seal lip 13d has an externally opened shape and is located at a peripheral rim of the enlarged tubular portion 13 and includes an edge opening 13a. The enlarged tubular portion also includes an inner sleeve hooking portion 13e which has a sectional U or C-shaped and is located at an opened peripheral rim of the enlarged tubular portion. As can be seen from the figures, the seal lip 13d and hooking portion 13e are integrally and/or continuously formed with the enlarged tubular portion 13. The inner sleeve 20 includes hooking ring portions 20a which protrude from an outer peripheral face of the inner sleeve 20. These hooking ring portions 20a are configured to be inserted and hooked in ring grooves 13f formed in the enlarged tubular portion 13. Ring grooves 13f are opened at the inner peripheral face of the inner sleeve hooking portion 13e. In this way, the inner sleeve 20 is stored and/or retained in the enlarged tubular portion 13 and is fixed therein.

The inner sleeve 20 also includes a pair of protruding locking hooks 20e and 20f which are used to hook the grommet to the car body. These hooks 20e and 20f are located on opposite side positions of the peripheral wall 20b and protrude in the area of the edge opening 13a. The inner sleeve 20 also has a locking frame 20c which is located on the peripheral wall 20b.

The locking frame 20c engages a locking hook 30a of a connector 30 is the area of a terminal insertion face 30b of a cavity (not shown) of the connector 30. The connector 30 is connected with terminals of electric wires W which are inserted through the small diameter tubular portion 12. The locking hook 30a is configured to engage the locking frame 20c in a manner which allows the connector 30 to be fixed to the inner sleeve 20 by locking.

As can be seen from FIG. 1B, the peripheral wall 20b of the inner sleeve 20 and the peripheral wall 13b of the enlarged tubular portion 13 are more greatly protruded and/or extended towards the small diameter tubular portion 12, than the same features of the prior art grommet. Moreover, the peripheral wall 20b extends beyond the terminal insertion face 30b of the connector 30 so as to form a large space 15. The large space 15 is thus formed between the terminal insertion face 30b and the bottom wall 13c of the enlarged tubular portion 13. This space can range from approximately 15 mm to approximately 20 mm, with 18 mm being preferred (i.e., the distance between surface 30b and surface 20d can be in the range of approximately 15 mm to approximately 20 mm, with 18 mm being preferred). Further, the bottom face of the peripheral wall 20d of the inner sleeve 20 is also configured to engage or contact the bottom wall 13c of the enlarged tubular portion 13.

Figure 3:
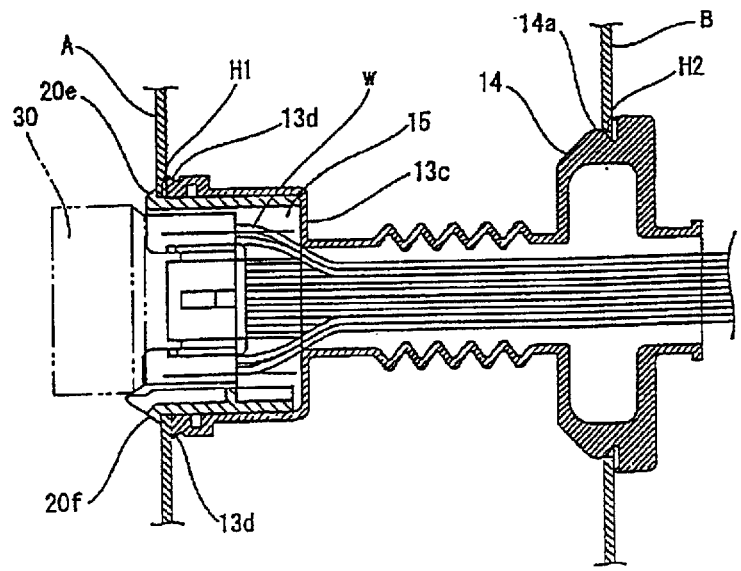
FIG. 3 shows a sectional view of a principal part illustrating a condition in which the grommet shown in FIGS. 1A–1B is installed in a penetration hole.

When the grommet 10 is installed in the penetration holes H1 and H2, the hooking groove 14a of the enlarged tubular portion 14 is first hooked on the peripheral rim of the penetration hole H2 of the door panel B. This allows the grommet 10 to be mounted in a sealed condition with respect to door panel B. A worker can then manipulate enlarged tubular portion 13 into opening H1 of panel A. During this manipulation, the worker may even engage the bottom wall 13c using one or more fingers. Insertion of the grommet 10 into opening H1 is achieved by engaging the locking hooks 20e and 20f, located at the edge of the internal inner sleeve 20, within the penetration hole H1 while strongly pressuring and/or pressing the grommet 10 towards the penetration hole H1. Installation is achieved when the locking hooks 20e and 20f are hooked on the inner peripheral rim of the penetration hole H1, and when the seal lip 13d abuts on the outer peripheral rim thereby mounting the grommet 10 in a sealed condition to the panel A, as shown in FIG. 3.

Figure 2:
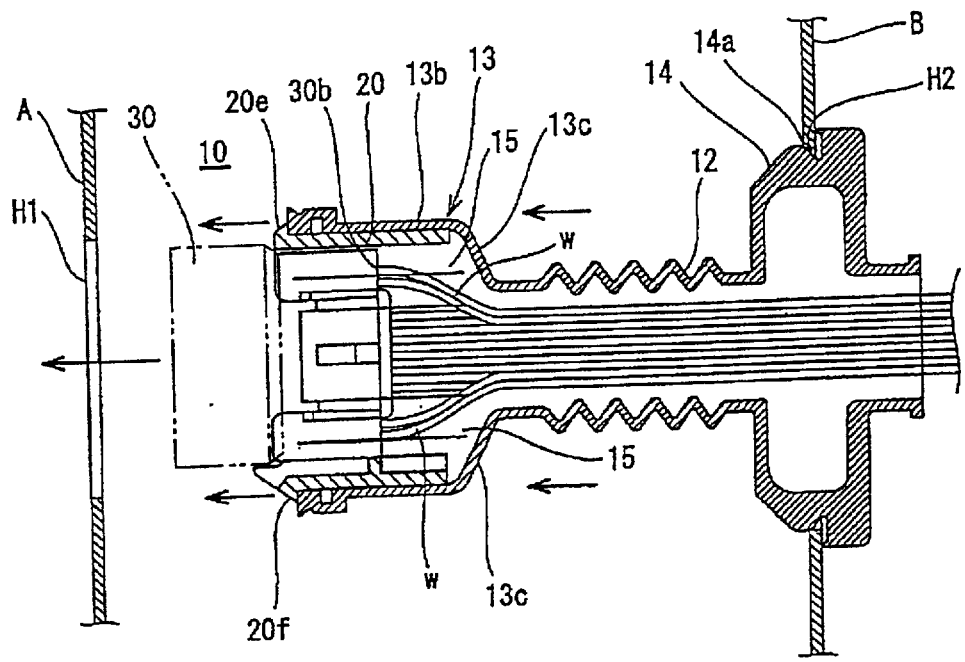
FIG. 2 shows a sectional view illustrating installing of the grommet shown in FIGS. 1A–1B, in a penetration hole.

It is clear from FIG. 2 that because a large space 15 exists between the bottom wall 13c of the enlarged tubular portion 13 and the terminal insertion face 30b of the connector 30, it is unlikely that any pressure will be exerted on the wires upon installation of the grommet 10. Thus, even if the bottom wall 13c of the enlarged tubular portion 13 experiences strong pressured or pressing in the insertion direction upon installation of the grommet 10, this pressure or pressing will be directed mainly to the bottom face of the peripheral wall 20d of the internal inner sleeve 20. However, this pressing will not cause any significant pushing and bending forces to be exerted on the electric wires W, especially in the area of the under-neck position of the connector 30. The invention therefore provides a configuration or arrangement wherein the electric wires W are protected by the peripheral wall 20b of the inner sleeve 20, by virtue of the wall 20b protruding back past terminal insertion face 30b. In this way, no load is loaded on the wires W. Further, since the inner sleeve 20 is utilized to provide rigidity to and/or to reinforce the peripheral wall 13b of the enlarged tubular portion 13, any force experienced by the enlarged tubular portion 13 upon installation is more easily transferred and/or directed to installing the grommet in opening H1 and even if the worker applied pressure to the bottom wall 13c of the enlarged tubular portion 13, there is little risk of damaging or stressing the wires W.

Further, since the space 15 is maintained even after installation of the grommet 10, the electric wires W of the under-neck position of the connector 30 do not collide and/or significantly engage the bottom wall 13c of the enlarged tubular portion 13. In this way, the wires W are not caused to be bent at a steep angle, as in the prior art. According, this arrangement provides for a condition in which the load loaded on the electric wires W is remarkably reduced. Furthermore, since the wires W are installed in the connector 30 in a manner which allows them to assume a more relaxed state, the electric wires W do not tend to influence and/or engage the bottom wall 13c of the enlarged tubular portion 13, i.e., the larger space 15 allows the wires W to assume a more relaxed state without significantly contacting the bottom wall 13c. In this way, any significant deformation of the enlarged tubular portion 13 is prevented and the appearance of the grommet 10 is thus improved.

Figure 4:
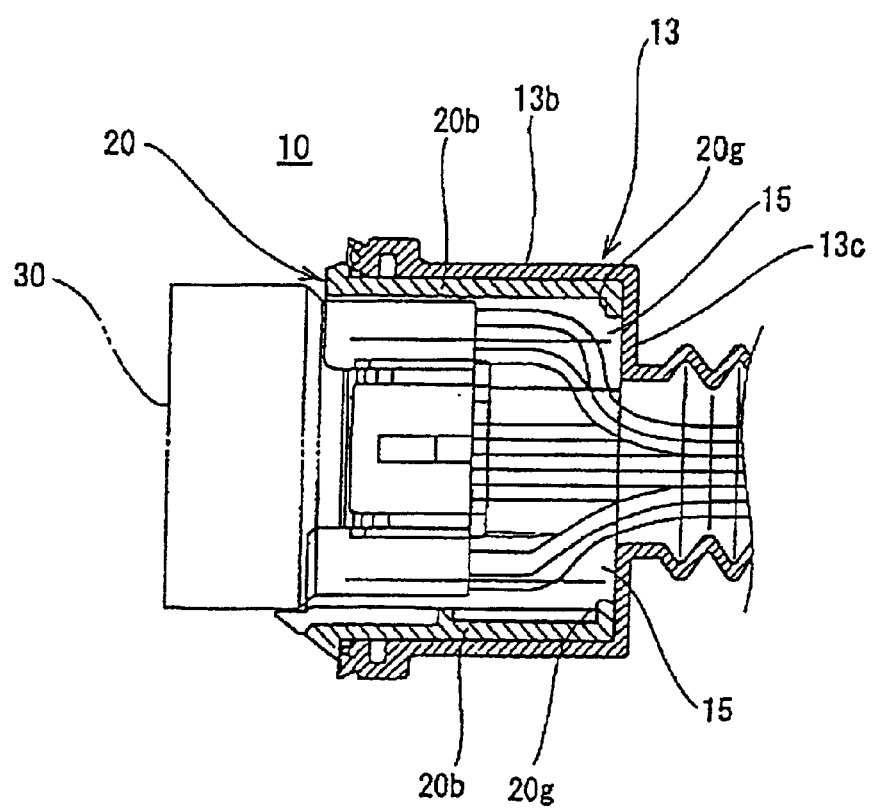
FIG. 4 shows a sectional view of a principal part illustrating the modified example of the mode of operation of the present invention.

FIG. 4 shows another embodiment of the invention in which the inner sleeve 20 has been modified to include a lip 20g. As can be seen in FIG. 4, the lip 20g is located at the back end of peripheral wall 20b and is slightly bent towards the inside of the grommet in the area of the bottom wall 13c of the enlarged tubular portion 13. The lip 20g has the shape of a ring and may be circular. As in the previous embodiment, the inner sleeve 20 is extended to the bottom wall 13c of the enlarged tubular portion 13 which can be pressured or pressed by a worker. The additional utilization of this lip 20g gives the inner sleeve even more rigidity and/or reinforcement, and thus makes it significant less likely that the wires W or inner sleeve 20 will be damaged upon installation of the grommet 10. This design also allows the grommet 10 to be installed more easily.

As is clear from the above illustrations, the present invention provides for a grommet in which the peripheral wall of the inner sleeve and the peripheral wall of the enlarged tubular portion are more greatly protruded and/or extended past the terminal insertion face of the connector. A large space is therefore provided between the terminal insertion face of the connector and the bottom face of the enlarged tubular portion. Accordingly, this design and/or arrangement prevents the electric wires in the area of the under-neck position of the connector from colliding immediately with the bottom face of the enlarged tubular portion and also prevents the wires from being bent at a steep angle. Further, even if the bottom face of the enlarged tubular portion is strongly pressured or pressed during in installation direction while being held by a worker, this pressure or force is not added and/or transferred to the internal electric wires. Thus, the grommet is installed with little or no load being loaded on the electric wires W, and the wires are prevented from snapping or breaking as result.

Furthermore, because of the above-mentioned space, any tension or stress of the electric wires does not influence the inner sleeve and/or the enlarged tubular portion. In this way, the enlarged tubular portion is not expanded and/or deformed as in the prior art, and the appearance of the grommet is improved.

Further, since the bottom face of the peripheral wall of the inner sleeve engages or hits the bottom wall of the enlarged tubular portion, the whole peripheral wall of the enlarged tubular portion is reinforced and/or made rigid, which means that the work of inserting the grommet is made easier.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A grommet that is insertable into a penetration hole of a car body panel of an automobile, comprising:

a resin inner sleeve which is adapted to receive a connector that is installed on a wire harness;

the inner sleeve comprising a peripheral wall having a bottom face and a car body hooking hook that is arranged on an outer face of a peripheral wall, the inner sleeve being stored and fixed in an enlarged tubular portion;

a grommet main body made of an elastomer and including the enlarged tubular portion located at one end of a small diameter tubular portion which is adapted to receive electric wires;

a connector receiving cavity being defined in the inner sleeve and including a terminal insertion face, whereby the connector receiving cavity is adapted to receive a connector;

the bottom face of the peripheral wall abutting on a bottom wall of the enlarged tubular portion; and a large space being provided between the terminal insertion face and the bottom wall of the enlarged tubular portion, whereby the grommet is installable on the automobile in a manner in which no load is applied to the electric wires which are inserted through the small diameter tubular portion when the bottom wall of the enlarged tubular portion experiences a pressing force.

2. The grommet of claim 1, wherein the inner sleeve comprises an inner lip in the area of the bottom face of the peripheral wall.

3. The grommet of claim 1, wherein the connector is locked within the inner sleeve.

4. A grommet comprising:

a grommet main body having a bellows shaped portion and an enlarged portion;

an inner sleeve retained within the enlarged portion and being adapted to receive a connector;

the inner sleeve comprising a peripheral wall with a bottom face, and engaging hooks which are configured to engage an opening in an automobile panel so as to secure the grommet to the automobile panel;

the inner sleeve comprising a cavity which is configured to receive a connector, wherein the cavity defines a terminal insertion plane; and a space being defined between the terminal insertion plane and the bottom face whereby the space is large enough to allow wires of a wire harness to be installed into the connector without the wires significantly engaging a bottom wall of the enlarged portion, wherein, when the grommet is installed into the automobile panel and experiences pressing forces in the area of the bottom wall of the enlarged portion, the wires are not significantly stressed or damaged by the installation.

5. A method of installing the grommet of claim 1 into a penetration hole of a car body panel of an automobile, the method comprising:

installing the wiring harness in the grommet; and hooking the inner sleeve into the penetration hole so that the enlarged tubular portion engages the car body panel.

6. A method of installing the grommet of claim 4 into a penetration hole of a car body panel of an automobile, the method comprising:

installing the wiring harness in the grommet; and hooking the inner sleeve into the penetration hole so that the enlarged tubular portion engages the car body panel.

7. A grommet comprising:

a grommet main body having a bellows shaped portion and an enlarged portion;

an inner sleeve retained within the enlarged portion and being adapted to receive a connector;

the inner sleeve comprising a peripheral wall with a bottom face, and engaging hooks which are configured to engage an opening in an automobile panel so as to secure the grommet to the automobile panel; and a space being defined between a terminal insertion plane and the bottom face whereby the space is large enough to allow wires of a wire harness to be installed into the connector without the wires significantly engaging a bottom wall of the enlarged portion.

8. The grommet of claim 7, wherein the inner sleeve comprises a cavity which is configured to receive a connector, wherein the cavity defines the terminal insertion plane.

9. The grommet of claim 7, wherein, when the grommet is installed into the automobile panel and experiences pressing forces in the area of the bottom wall of the enlarged portion, the wires are not significantly stressed or damaged by the installation.

10. A method of installing the grommet of claim 7 into a penetration hole of a car body panel of an automobile, the method comprising:

installing the wiring harness in the grommet; and hooking the inner sleeve into the penetration hole so that the enlarged tubular portion engages the car body panel.

* * * * *